R. L. FRINK.
METHOD OF CLEANING GLASS BAITS.
APPLICATION FILED JULY 3, 1911.
1,159,579.
Patented Nov. 9, 1915.
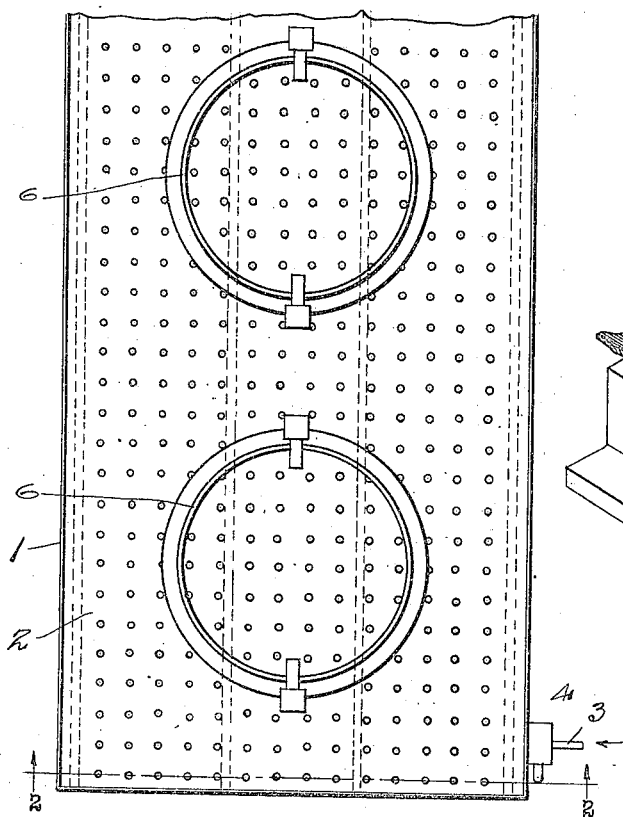
FIG. 1
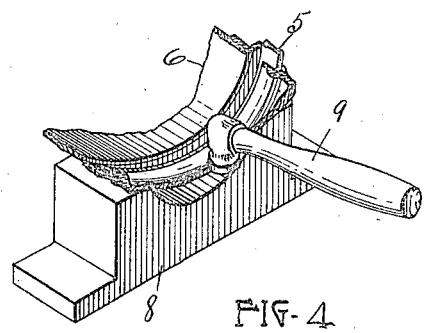
FIG. 4
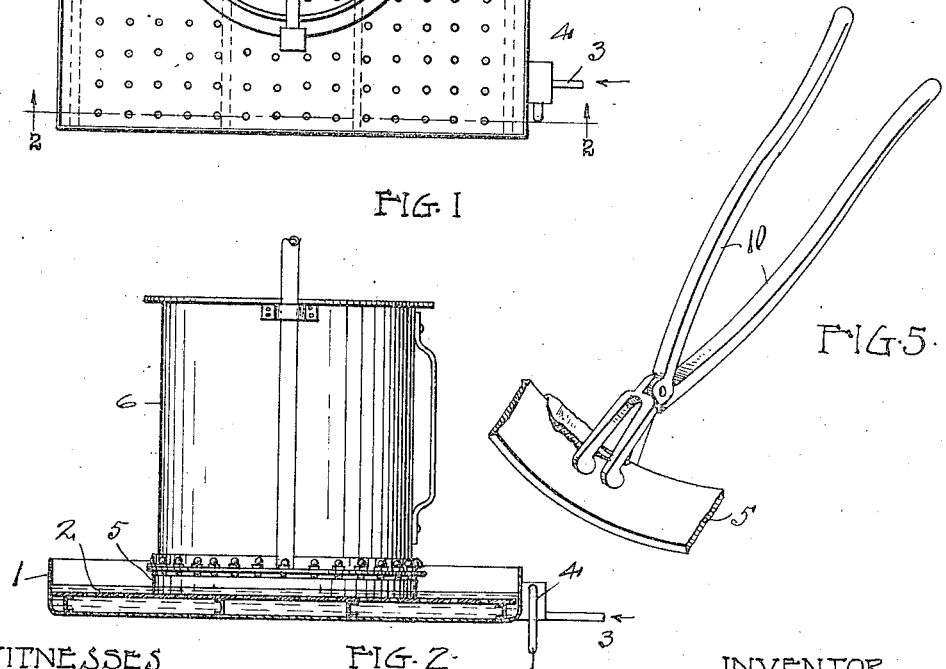
FIG. 2
FIG. 5
FIG. 3
WITNESSES
Oliver M. Kappler
Jno. F. O'Brien
INVENTOR
Robert L. Frink
BY J. B. Fay
ATTORNEY

UNITED STATES PATENT OFFICE.

ROBERT L. FRINK, OF COLUMBUS, OHIO.

METHOD OF CLEANING GLASS-BAITS.

1,159,579.    Specification of Letters Patent.    Patented Nov. 9, 1915.

Application filed July 3, 1911. Serial No. 636,637.

*To all whom it may concern:*

Be it known that I, ROBERT L. FRINK, a citizen of the United States, and a resident of Columbus, county of Franklin, and State of Ohio, have invented a new and useful Improvement in Methods of Cleaning Glass-Baits, of which the following is a specification, the principle of the invention being herein explained and the best mode in which I have contemplated applying that principle, so as to distinguish it from other inventions.

The present invention is concerned more particularly with glass baits of the type shown and described in United States Patent No. 972,615, granted me October 11, 1910.

The object of the invention is to provide a simple and expeditious method, and apparatus for use therein, whereby the residue of glass adhering to such bait may be removed therefrom.

The bait in question, is characterized by the use of a flexible metallic band or ribbon for the bait member proper, which comes in contact with the bath of molten glass, and to which the upper end of the cylinder adheres during the drawing operation. After the cylinder is severed, there will still remain at least a coating of glass on such flexible bait member. This, it has been found, must be thoroughly and completely removed before the drawing operation can be repeated; in other words, the proper adhesive and cohesive connection of the glass of the new cylinder with the bait member, is apparently conditional upon such member presenting a bright, clean, metallic surface.

The present invention consists then, of the steps and means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

In said annexed drawing:—Figure 1 is a plan view of one approved construction of apparatus for use in connection with the present improved method of cleaning baits; Fig. 2 is a transverse section thereof, taken on the line 2—2, Fig. 1; Fig. 3 is a similar transverse section showing a slightly different form of construction; Fig. 4 illustrates another piece of apparatus, or device, used in conjunction with the foregoing; while Fig. 5 is an optional form of such additional apparatus or device.

The general method of procedure involved, it may be preliminarily explained, consists in chilling the glass and the bait member, to which it adheres, thereupon flexing such bait member, and then brushing the member to frictionally remove any remaining particles of the chilled glass. For the purpose of thus chilling the glass and bait member, I preferably employ a pan 1, of metal or other like material, (Fig. 1) in which a false, perforated bottom 2 is supported some distance above the floor or bottom proper, of the pan. The water or equivalent cooling medium enters the pan by an inlet pipe 3, and is discharged therefrom by an outlet pipe 4, so arranged (see Fig. 2) as to maintain a constant level of water in the pan. As indicated, the level of the water is such as to entirely submerge the false bottom 2, a depth of approximately one-fourth inch of water above such bottom being desirable. This depth, in other words, is gaged to only partially submerge the ribbons 5 that form the bait members proper of the bait 6, shown as resting in the chilling pan in Figs. 1 and 2.

In the modified form of construction illustrated in Fig. 3, in addition to such false bottom or perforated plate 2, I employ a bed or mat 7 of asbestos, or other bibulous material, placing the same upon such bottom, to a thickness substantially equal to, or greater, than the level of water maintained in the pan. The glass bait 6, to be chilled, after being removed from their carriers or supports in the glass drawing machine, the cylinders or rollers in each case being severed therefrom, are immediately placed in the pan, with the lower edge of the flexible bait member 5, proper, resting upon the perforated plate or bibulous mat. By reason of the action of the water, or cooling fluid, surrounding or in contact with the bait member in the constructional form of Figs. 1 and 2, or by reason of the chilling action produced by the rising vapor and the contact of the glass or edge of the bait member with the asbestos or bibulous mat in the form of construction illustrated in Fig. 3, the glass is rapidly cooled, and the greater portion of the same thereby removed, by reason of the difference in the rates of contraction of the bait member and the glass adhering thereto. The bait is allowed to rest in the pan until this cooling effect has exhausted the possibilities of removing glass in this way. Thereupon I remove the bait from the pan, and place it with the aforesaid flexible bait member resting on an anvil 8 having a concave surface of a curvature less than that of said member, as shown in Fig. 4; then by lightly tapping the ribbon-like member with a hammer 9 or like implement, successive blows being delivered at successive points as the bait member is rotated across the anvil, any remaining fragments of glass adhering or fastened to the bait member are broken loose and disengaged therefrom by the flexure of the member thus produced.

It is to be understood that the bait member should not be subjected to any pounding or bending, such as would permanently distort it; the bending, on the contrary, is desirably kept within the elastic limits of the material composing said member. Only a relatively limited section of the bait member, furthermore, is flexed at any one time, whichever type of flexing device is employed. In lieu of thus tapping the member in order to produce this flexure, and thereby detaching the remaining fragments of glass, a device in the form of a tongs or pliers 10, as illustrated in Fig. 5, may be employed. In such event, the use of an anvil is dispensed with, since the pliers are constructed to engage both sides of the bait, so that by simply closing the handles, the slight flexure of the bait member, which is required to free the particles of glass therefrom, is secured. After having flexed the bait member in the fashion just described, it may be found advisable under certain conditions, to brush the same with a stiff wire brush, or to apply a sand-blast thereto, in order to insure the complete removal of any remaining particles of glass that cling thereto. By this concluding operation, moreover, any oxid that may have formed about the line of contact of the glass with the metal of said bait member is removed.

By the foregoing several steps, constituting my improved method, the surface of the metal ribbon, forming the flexible bait member, will be left perfectly clear and clean, and will not show any discoloration by reason of absorbed oxid, so that the glass may firmly adhere or attach itself thereto in the next succeeding drawing operation.

It should be explained that the cleaning of a bait member of the type under consideration, is quite a different, as well as a more difficult proposition, than the cleaning of the more familiar tools and implements of the glass-blowers' art. For in all prevailing types of blowers' pipes and the like, the tool is composed of a considerable mass of metal to which the glass is attached by what I shall term "adherence," because there is invariably formed a stratum of oxid of the metal between the glass and the pure metal of the tool. This oxid, I assume, is formed incidentally to the pre-heating of the tool, which is always necessary with tools of this class.

In the case of bait members of the class herein referred to, on the contrary, such members consisting of a relatively thin, flexible band or ribbon of metal, the cross-section or volume of the member is such as to permit said member to be heated, to a point where the glass will unite with it, by the contained heat of the glass, without any pre-heating whatever. The union thus obtained between glass and bait, is materially different from the "adhesion" previously discussed, and, to distinguish therefrom, may be termed "cohesion." The surface of the metal, in the case of such cohesion, remains perfectly clear and clean and does not show any of the discoloration produced by absorbed oxid.

It is more particularly to meet the difficulties of properly cleaning the bait, that are presented by this condition, that the present improved method and apparatus have been devised; although it is not meant by this, to imply that such use will constitute the only field for application of the invention.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. The method of cleaning glass-baits of the class described, which consists in chilling the bait member, proper; then flexing the same; and finally subjecting said member to friction, whereby the contacting surface thereof is not only cleansed of adhering glass but also left bright and clear of oxid, substantially as described.

2. The method of cleaning glass-baits of the class described, which consists in chilling the bait member, proper, by dipping the same in a cooling liquid; then flexing said member in small sections at a time so as to avoid distorting the same; and finally subjecting said member to friction; whereby the contacting surface thereof is not only cleansed of adhering glass but also left bright and clear of oxid, substantially as described.

3. The method of cleaning glass baits of the class described which consists in immersing the bait member in a cooling liquid to a level below that of the member attached to said bait, flexing such bait and thereby removing the residual glass therefrom.

Signed by me this 28th day of June, 1911.

ROBERT L. FRINK.

Attested by—
J. C. NAILOR,
C. E. BLANCHARD.